Figure 1:
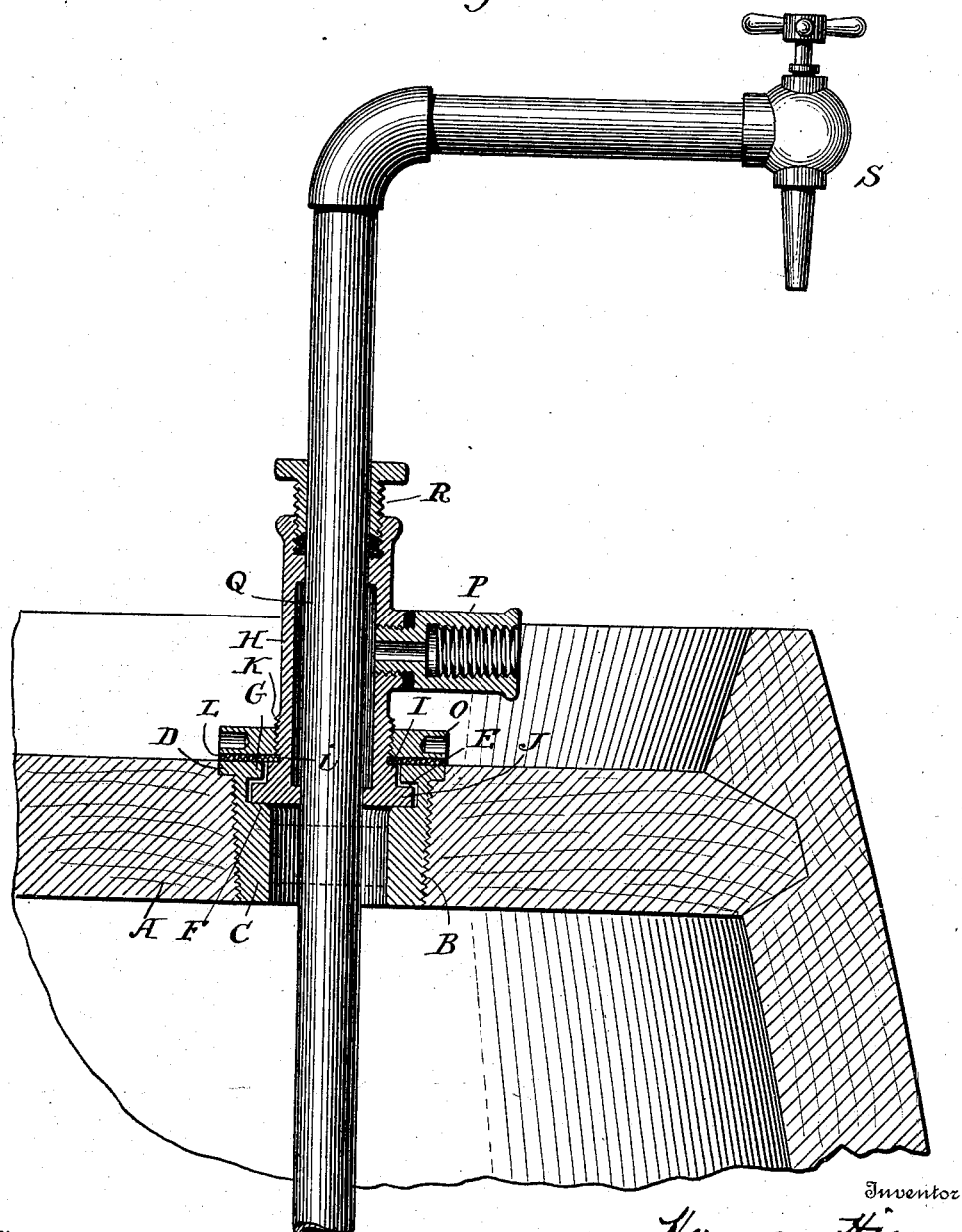

No. 717,500. Patented Dec. 30, 1902.
H. HINZ.
DEVICE FOR TAPPING LAGER BEER KEGS.
(Application filed Nov. 25, 1901.)
(No Model.) 2 Sheets—Sheet 2.

UNITED STATES PATENT OFFICE.

HERMANN HINZ, OF FRANKFORT, KENTUCKY.

DEVICE FOR TAPPING LAGER-BEER KEGS.

SPECIFICATION forming part of Letters Patent No. 717,500, dated December 30, 1902.

Application filed November 25, 1901. Serial No. 83,570. (No model.)

*To all whom it may concern:*

Be it known that I, HERMANN HINZ, a citizen of the United States, residing at Frankfort, in the county of Franklin and State of Kentucky, have invented certain new and useful Improvements in Devices for Tapping Lager-Beer Kegs, of which the following is a specification.

My invention relates to improvements in devices for tapping barrels of beer and other beverages; and it consists in the particular tapping device or beer-tap hereinafter described in the accompanying specification, illustrated in the drawings, and particularly pointed out in the claim.

Figure 2:
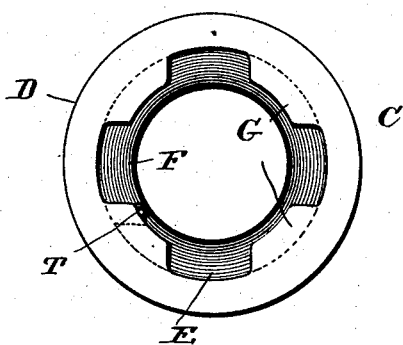
Figure 3:
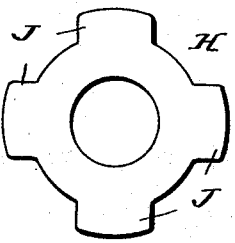
Figure 4:
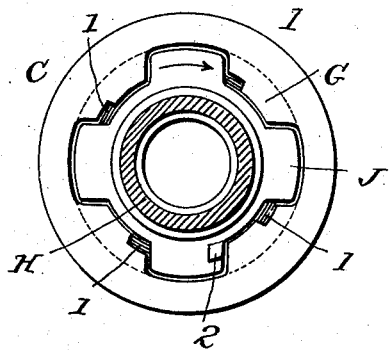

In the accompanying drawings, Figure 1 is a sectional view of my beer-tap shown arranged in the head of a barrel. Fig. 2 is a plan view of the bushing, and Fig. 3 is an end view of the tube. Fig. 4 is a plan view, partly in section, of the bushing and tube, showing a modified form of construction.

Referring to the drawings, A represents the head of a beer or other barrel provided with a bung-hole B, in which is secured a cylindrical bushing C, preferably of metal and screw-threaded on the outside in order to fix the same securely within the bung-hole, although any suitable means may be provided for fixing the bushing in the bung-hole. The bushing C is also preferably provided with an outer annular flange or rim D, adapted to a recess around the top of the bung-hole, to prevent the bushing from entering too far within the barrel and to bring the top of the bushing flush with the top of the barrel. The bushing is also provided within an inner annular recess E, formed by a shoulder F in the bushing, and a plurality of inwardly-projecting tongues G, arranged above the shoulder and having spaces between the several tongues. As shown, there are four tongues provided, which is a convenient number and forms a construction which is found to be convenient.

H represents a tube, which is provided at one end with an outer annular flange I, having a plurality of lugs J, adapted to fit the spaces between the tongues on the bushing and rest upon the shoulder F, and the flange I on the tube is also adapted to fit within the inner ends of the tongues G on the bushing.

Immediately above the flange I, as shown, the tube is provided with a screw-threaded portion K, and this screw-threaded portion is preferably immediately adjacent to the annular flange I.

A washer or gasket L of any suitable material, as rubber or leather, surrounds the tube H at the screw-threaded portion and is adapted to rest directly upon the annular flange I, while a screw-threaded ring or annulus O is arranged on the screw-threaded portion of the tube immediately above the gasket, so that it may be screwed down upon the same. Instead of extending the screw-threads of the screw-threaded portion K all the way to the flange I a portion of the tube *i* may be left without screw-threads, forming a groove in which the gasket L is arranged, forming a tight joint.

In assembling the parts the lugs J of the tube are placed within the spaces between the tongues of the bushing and a slight rotation of the tube will securely lock the parts together. By then screwing down the annulus O a tight joint may be formed, preventing leakage.

The tube H is provided with the usual connection P for air or gas supply, and a draft-tube Q is arranged to be inserted within the tube H down into the beverage to be tapped, a suitable stuffing-box R being provided at the upper end of the tube H, while the draft-tube Q may have the usual cock S.

In order that the tube H, with its lugs, may not be turned too far for locking purposes, any suitable means may be provided for limiting the movement, such as a pin T, in the recess in the bushing. When the beer-tap is not in use, the bung-hole is of course stopped by any suitable means, as a cork, which may be arranged to be pushed out when the draft-tube Q is inserted.

It will thus be seen that my construction is exceedingly simple, and my tapping device therefore may be quickly operated without unnecessary loss of time and manipulation of parts.

In the modified form of locking means shown in Fig. 4 the tongues G on the bushing are each provided with a suitable notch 1, while one of the lugs J is provided with a projecting pin 2 on its upper portion adapted to lie substantially flush with the top of the tongues G when the lugs are placed in the spaces between the tongues. Then by giving the tube a partial turn to the right, referring to the position of the parts as shown in Fig. 4, portions of the lugs J will pass under the tongues G and the pin 2 will engage a notch 1, so that the tube will be locked to the bushing. This is a convenient construction and will allow the tube to be locked in any one of a number of different positions.

Without limiting myself to the precise details of construction shown and described, I claim—

In a beer-tap, the combination of a bushing provided with an inner annular recess formed by a shoulder in the bushing, a plurality of inwardly-projecting notched tongues G above the same, with spaces between the tongues, a tube provided at one end with a plurality of lugs, one of which is provided with an upwardly-projecting pin adapted to lie substantially flush with the top of the tongues when the lugs are placed in the spaces between the tongues, said lugs being adapted to fit the spaces between said tongues and arranged to engage under the tongues when the tube is revolved and rest upon said shoulder, a screw-threaded portion on said tube, a gasket or washer surrounding the screw-threaded portion, a screw-threaded ring or annulus on said portion, and a connection on said tube for air or gas supply, substantially as described.

In testimony whereof I have signed my name to this specification in the presence of two subscribing witnesses.

HERMANN HINZ.

Witnesses:
A. W. OVERTON,
R. S. BURTON.